(12) United States Patent
Wu et al.

(10) Patent No.: US 8,204,868 B1
(45) Date of Patent: Jun. 19, 2012

(54) METHOD AND SYSTEM FOR IMPROVING PERFORMANCE WITH SINGLE-INSTANCE-STORAGE VOLUMES BY LEVERAGING DATA LOCALITY

(75) Inventors: Weibao Wu, Vadnais Heights, MN (US); Xianbo Zhang, Madison, WI (US)

(73) Assignee: Symantec Operating Corporation, Mountain View, CA (US)

( * ) Notice: Subject to any disclaimer, the term of this patent is extended or adjusted under 35 U.S.C. 154(b) by 381 days.

(21) Appl. No.: 12/165,496

(22) Filed: Jun. 30, 2008

(51) Int. Cl.
*G06F 17/30* (2006.01)
(52) U.S. Cl. ....................................................... 707/693
(58) Field of Classification Search .................. 707/640, 707/641, 674, 999.204, 999.101, 664, 692, 707/693; 711/154, 159, 160
See application file for complete search history.

(56) References Cited

U.S. PATENT DOCUMENTS

| | | | |
|---|---|---|---|
| 6,470,329 B1 * | 10/2002 | Livschitz | 1/1 |
| 2002/0129200 A1 * | 9/2002 | Arakawa et al. | 711/112 |
| 2003/0061546 A1 * | 3/2003 | Collins et al. | 714/42 |
| 2003/0149683 A1 * | 8/2003 | Lee et al. | 707/1 |
| 2008/0104347 A1 * | 5/2008 | Iwamura et al. | 711/162 |
| 2009/0112946 A1 * | 4/2009 | Jones | 707/204 |

* cited by examiner

*Primary Examiner* — Thu-Nguyet Le
(74) *Attorney, Agent, or Firm* — Campbell Stephenson LLP (57) ABSTRACT

A method and system for improving performance with single-instance-storage volumes by leveraging data locality is provided. A client provides a set of fingerprints generated from data segments to be saved to a single-instance storage volume and receives the information on whether a data segment exists on the single-instance storage volume and where it is stored if a data segment exists. Based on its received information, the client determines if a number of non-sequential accesses of a computer-readable medium for the set of segments from the single-instance-storage volume exceeds a predetermined threshold. If so, the client provides the whole set of data segments for storage within the single-instance storage volume regardless of whether or not the data segments are duplicate data segments. These sent data segments will be stored contiguously within the single-instance storage volume while the duplicates will be removed from their previous stored locations.

15 Claims, 9 Drawing Sheets

METHOD AND SYSTEM FOR IMPROVING PERFORMANCE WITH SINGLE-INSTANCE-STORAGE VOLUMES BY LEVERAGING DATA LOCALITY

BACKGROUND OF THE INVENTION

1. Field of the Invention

The present invention relates in general to the field of data processing systems, and more particularly, the present invention relates to managing data in a networked data processing system environment incorporating a single-instance-storage volume.

2. Description of the Related Art

An ever-increasing reliance on information and computing systems that produce, process, distribute, and maintain such information in its various forms, continues to put great demands on techniques for providing data storage and access to that storage. Business organizations can produce and retain large amounts of data. While data growth is not new, the pace of data growth has become more rapid, the location of data more dispersed, and linkages between data sets more complex.

Generally, a data deduplication system provides a mechanism for storing a piece of information only one time. Thus, in a backup scenario, if a piece of information is stored in multiple locations within an enterprise, that piece of information will only be stored one time in a deduplicated backup storage area. Similarly, if the piece of information does not change during a subsequent backup, that piece of information will not be duplicated in storage as long as that piece of information continues to be stored in the deduplicated backup storage area. Data deduplication can also be employed outside of the backup context thereby reducing the amount of active storage occupied by duplicate files.

The storage area of a data deduplication system is called a single-instance-storage (SIS) volume. Sets of data segments are stored in the SIS volume. As new sets of data segments are stored, previously stored sets of data are checked for duplicate segments of data. Duplicate data segments of data in a new set of data segments are not stored in the SIS volume, but instead are presented by pointers to the previously stored data segments. As new sets of data segments are stored, the physical location in the storage device of stored data representing those data segments tends to be scattered all over the SIS volume by the nature of the use of pointers to previously stored data segments. While this use of pointers saves space by eliminating duplicate data segments, the resultant physical scattering of stored data creates inefficiencies for data retrieval because access to later-stored sets of data segments from the SIS volume involves a large number of random disk accesses. Thus, there is a need for a mechanism to enable more efficient data retrieval from a SIS volume.

SUMMARY OF THE INVENTION

The present invention includes a method and system for improving performance with single-instance-storage volumes by leveraging data locality. A client provides a set of fingerprints generated from data segments to be saved to a single-instance storage volume and receives the information on whether a data segment of the set of data segments exists on the single-instance storage volume and if so, the location of the data segment. Based on this received information, the client determines if a number of non-sequential accesses of a computer-readable medium for the set of segments from the single-instance-storage volume exceeds a predetermined threshold. If the threshold is exceeded, the client provides the whole set of data segments to the single-instance storage volume regardless of whether or not the data segments are duplicate data segments. The data segments will then be stored contiguously within the single-instance storage volume while the previously-stored duplicates will be removed from their locations.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Embodiments of the present invention provide for more efficient retrieval of sets of data segments stored in a SIS volume by increasing spatial locality of more recently stored sets of data segments. This increased spatial locality is provided by intentionally allowing data segments in a more recently stored set of data segments to replace previously stored data segments. In so doing, groupings of data segments having spatial locality in the SIS storage device can be formed in a more recently stored set of data segments, thereby decreasing a number of disk accesses to locate contiguous data segments.

A general concept behind data deduplication is to reduce an amount of storage needed for enterprise data by eliminating duplicated data content. A deduplicated data storage area is called a single instance storage (SIS) that is only a single instance of a piece of data is stored in the single instance storage area. A common use of single instance storage is in maintaining data backups for servers and other computing equipment in an enterprise network. For each backup, only a single instance of information duplicated in the enterprise network will be stored in the single instance storage area. In addition, for backups occurring over time, data that has not changed from one backup to another need not be stored in a subsequent backup. In this manner, significant savings in data storage space can be realized.

As an example of data deduplication in a backup environment, an initial full backup of a file server can be performed in which the data included in the backup is divided into data segments and identified. Subsequent daily backups of the file system involve identifying new or changed segments of data using the same data identification system as performed with the full backup and then storing just the new or changed data in the single instance storage area. Depending upon the number of new or changed files in the file system, a reduction of size of the backup subsequent to the initial full backup can be as much as 99%. The single instance store approach to backup allows for very small daily backups with an ability to recover a full image from any backup on any day. Furthermore, the distinction between a "full" backup and an "incremental" backup disappears. All backed up data can be restored at any time using a single backup restore.

Figure 1:
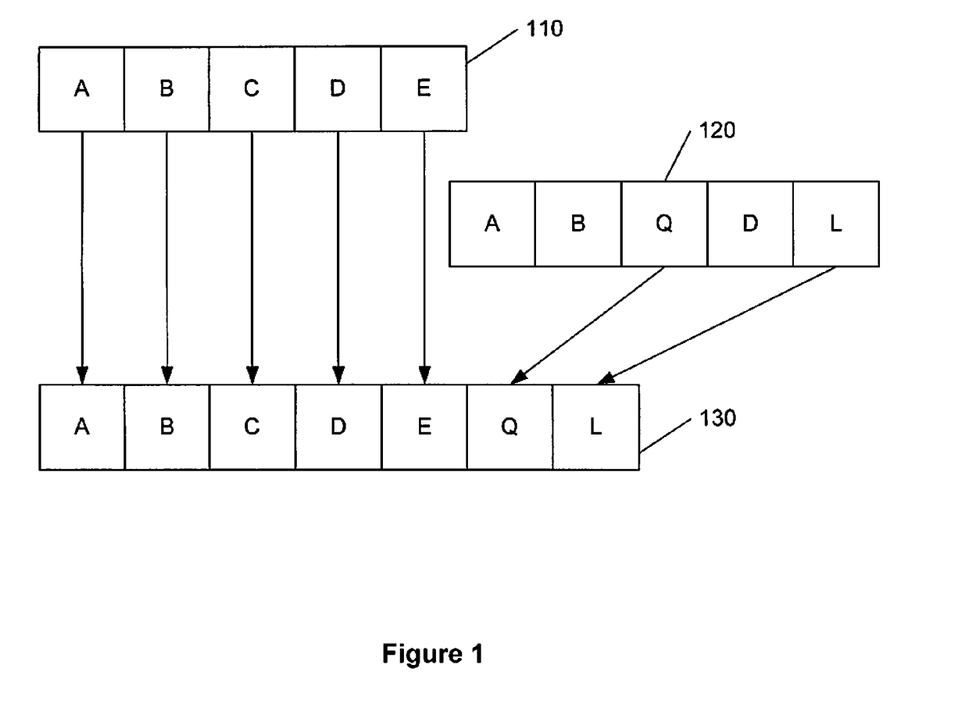
FIG. 1 is a simplified block diagram illustrating an example method of data deduplication according to an embodiment of the present invention.

FIG. 1 is a simplified block diagram illustrating an example method of data deduplication in accordance with an embodiment of the present invention. Files 110 and 120 share identical content, but the files themselves are not completely identical. Each file is broken into equal sized segments: A, B, C, D, E, F for file 110 and A, B, Q, D, L for file 120. The data deduplication system will write file segments A, B, C, D, E, Q, and L into the single instance storage area (130) and will not write file segments A, B, and D from file 120 into the single instance storage area. Thus, if two data segments are the same, one can save space in a single instance storage area by only storing one copy of the segment and providing two pointers to that segment. In order to track a location of data for a file, metadata containing, for example, pointers to the data of a file will also be stored in a metadata storage area.

Figure 2:
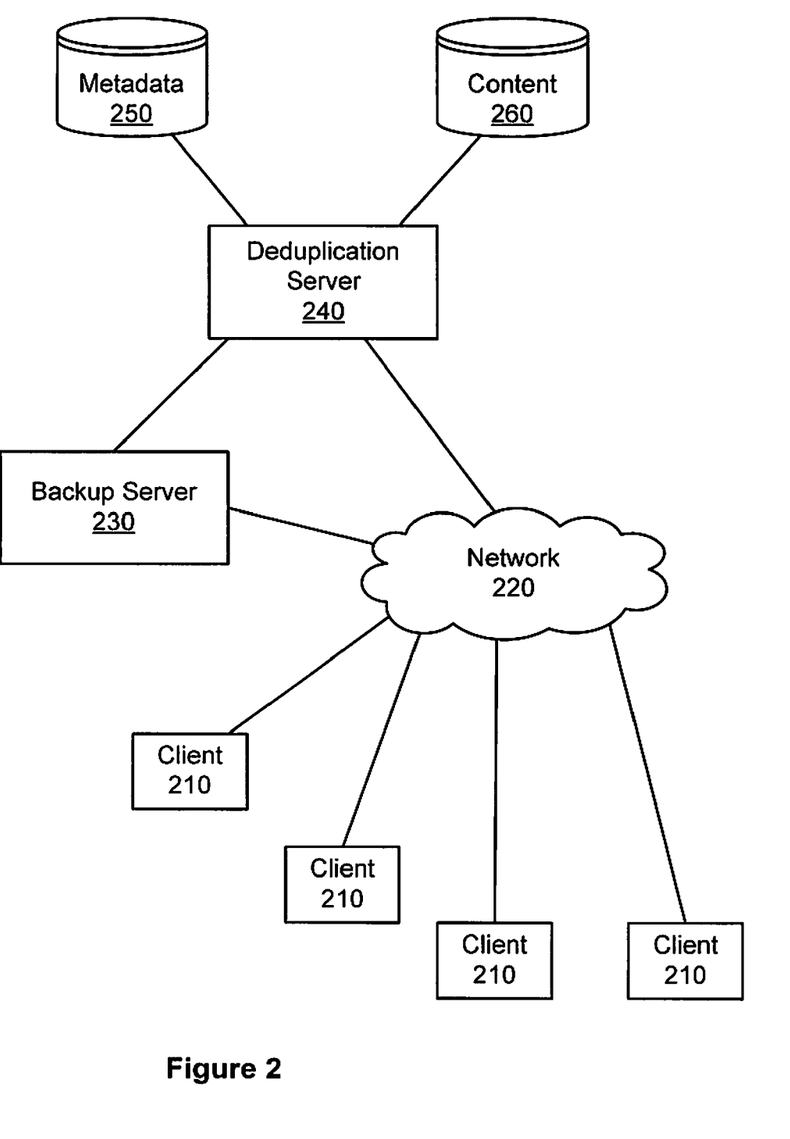
FIG. 2 is a simplified block diagram depicting an example network incorporating a deduplication system in which an embodiment of the present invention may be implemented.

FIG. 2 is a simplified block diagram of a network incorporating a deduplication system usable with embodiments of the present invention. Client computers 210 are coupled to a network 220. Each client computer has access to one or more file systems that are stored in either storage volumes directly-coupled to each of the clients or by storage volumes that are served to the client computers by a storage area network (SAN), network attached storage (NAS), storage appliance and the like (not shown). Client computers can include, for example, servers and desktop nodes. Embodiments of network 220 can include, for example, a local area network, metro area network, wide area network, or any combination thereof.

Backup server 230 is also coupled to network 220. Backup server 230 is configured to, for example, manage administrative tasks related to backing up clients 210. Such tasks include communicating with clients 210 to initiate backup tasks on the clients, maintaining databases related to files and other information backed up from file systems associated with the clients, and managing or tracking resources storing backups of clients 210. In the system illustrated in FIG. 2, backup server 230 is further configured to communicate with deduplication server 240 for purposes of storing backups of client 210 in resources controlled by deduplication server 240. Such communication can be via network 220 or via a direct link between the backup server and the deduplication server.

Deduplication server 240 is coupled to network 220 and performs a variety of tasks related to management and implementation of deduplication services for the system illustrated in FIG. 2. Deduplication server 240 can include one or more physical servers configured to perform a variety of tasks related to deduplication. Deduplication server 240 is in turn coupled to a storage pool for deduplicated data that includes one or more metadata volumes 250 and one or more content volumes 260.

Figure 3:
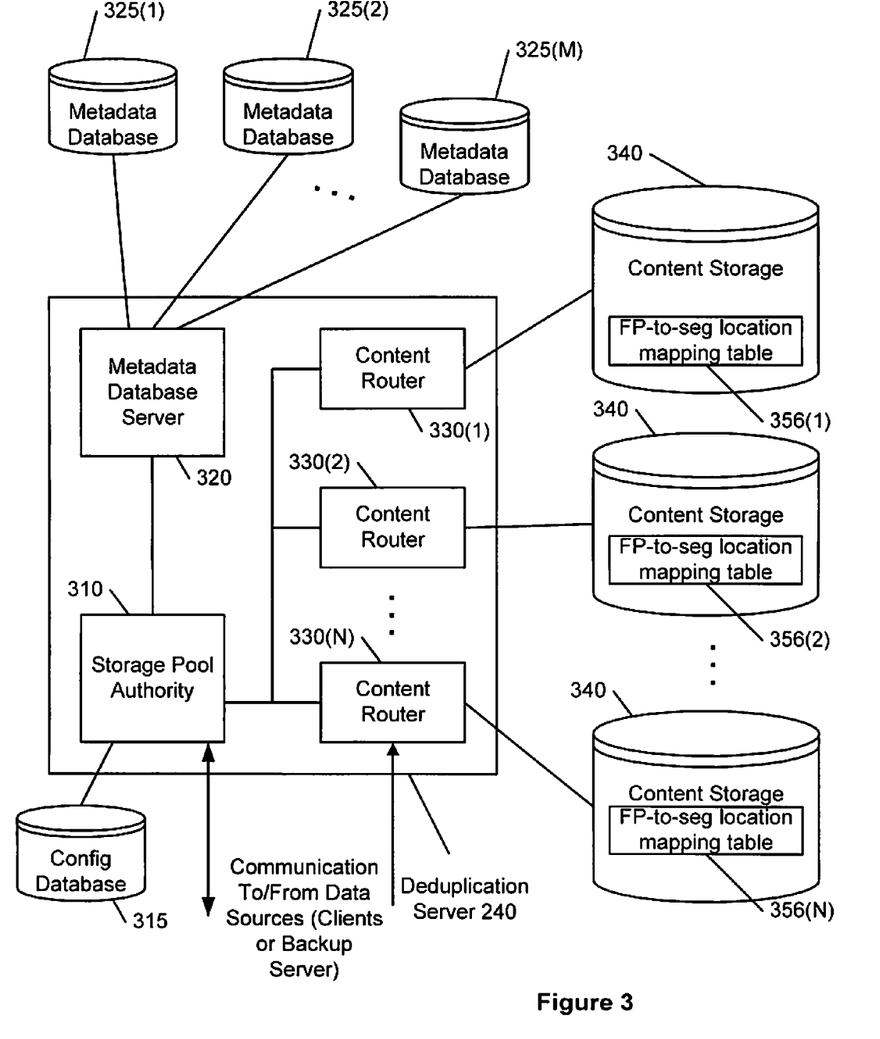
FIG. 3 is a simplified block diagram illustrating components of a deduplication server as shown in FIG. 2.

FIG. 3 is a simplified block diagram illustrating components of deduplication server 240. Storage pool authority module 310 performs administration tasks related to management of the storage pool resources. Among such administrative tasks include setting policies for storage resources, such as retention times for data stored, types of metadata associated with stored data that is required, size of data segments, and the like. Storage pool authority module 310 can also perform scheduling-related tasks, management of concurrently arriving data streams, and management of data being provided to content storage (e.g., locations for storing various incoming data). Storage pool authority module 310 can store configuration information for the storage pool in a configuration database 315.

Deduplication server 240 also includes a metadata database server module 320 that communicates with storage pool authority 310. Metadata database server module 320 is configured to distribute metadata received from storage pool authority 310 to one or more metadata database engines 325(1)-(M). Such metadata includes information about the nature of the data stored by the storage pool. The metadata stored by metadata database engines 325(1)-(M) will be discussed in greater detail below.

Deduplication server 240 also includes one or more content routers 330(1)-(N) that are communicatively coupled to storage pool authority 310. The content routers are configured to receive data content being stored in the storage pool managed by deduplication server 240 and to manage the storage of that data in one or more content storage volumes 340. Storage pool authority module 310 can be configured to distribute data in a fair and efficient manner across all content routers 330(1)-(N).

Content storage volumes 340(1)-(N) are further configured to include a collection of containers 354(1)-(N). The containers store data segments in the manner dictated by backup module 350(1)-(N) and compaction module 352(1)-(N). The containers also store a list of segment signatures of each file. For example, according to an embodiment of the present invention, if a file comprises five data segments, and the data segments have the fingerprint signatures FP1-FP5, all of the segment data is stored within one of the collection of containers 354(1)-(N). Fingerprints FP1-FP5 are a hash or checksum of the data segment content. All of the data segments may not be in the same container and may not even be stored in a contiguous fashion. A fingerprint of the file is a hash of the content concatenated from fingerprints FP1-FP5 (FP6=Hash (FP1-FP5)). The hash of the content concatenated from these five fingerprint signatures is also treated like a segment and stored in a container 354(1)-(N).

Containers 354(1)-(N) also store a fingerprint (FP)-to-segment location mapping table 356(1)-(N), which maps the fingerprint signatures to the storage locations of the data segments within containers 354(1)-(N). Returning to the earlier example, the FP-to-segment location mapping table includes FP-to-segment location pairs [FP1, loc1], [FP2, loc2], . . . [FP5, loc5], and [FP6, loc6], where loc1-5 is the location of the data segments within the containers. FP6 is the fingerprint signature of the file that comprises data segments 1-5. FP6 is also cataloged in metadata database 325(1)-(N) as part of the metadata of the file. During operation of an embodiment of the present invention, content routers 330(1)-(N) load a copy of an associated FP-to-segment location mapping table 356(1)-(N) into random-access memory to facilitate access times to the FP-to-segment location mapping table 356(1)-(N).

It should be recognized that modules 310, 320 and 330 can be executed by one or more physical servers configured to perform the functionality required by the various modules.

Figure 4A:
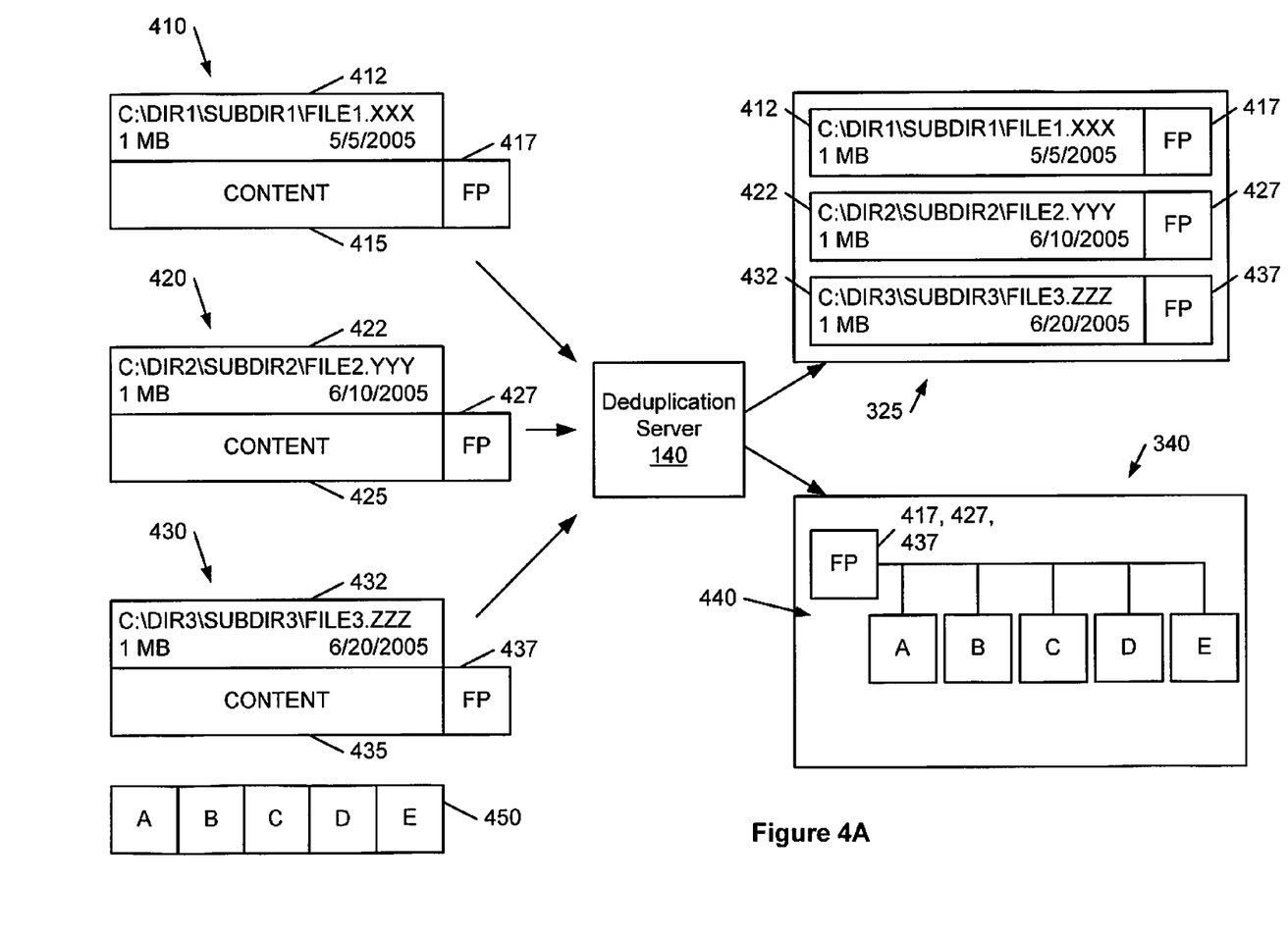
FIG. 4A is a simplified block diagram depicting information stored in a metadata database engine and the content routers of a deduplication system in accordance with an embodiment of the present invention.

FIG. 4A is a simplified block diagram illustrating an example of information stored by the metadata database engines and the content routers of a deduplication system capable of implementing embodiments of the present invention. FIG. 4A illustrates client files 410, 420 and 430, each of which contains identical content that is divided into data segments. Files 410, 420 and 430 can be located on the same client or on different clients. Each file is associated with metadata that describes the file (412, 422, 432), including, for example, the filename, size of the file, and a modification date. Each file also contains the fingerprint list of its composing data segments (415, 425, and 435). Identity of a data segment is established by a fingerprint generated based on the content of the data segment. Identity of the content of the files is established by a fingerprint generated using the content of each file (417, 427, 437) or using the fingerprint list of the file's data segments. The fingerprint of a piece of data is generated, for example, using a hash or checksum process sufficient to uniquely identify the file content.

A deduplication process can proceed in the following manner. If, for example, file 410, 420 and 430 are being backed up, file 410 is provided to deduplication server 140. Metadata 412 associated with file 410 is provided to a metadata database engine 325 along with the associated fingerprint 417. Content 415 of file 410 is divided into a set of segments A, B, C, D and E (450) and these segments together with their fingerprints are provided to a content router 330 for storage in a content storage volume 340. The fingerprint list of segments A, B, C, D, and E along with the associated fingerprint 417 is stored in a content storage volume 340 as a storage object 440. Thus, the unique fingerprint 417 serves as a link between the information stored in the metadata database and the file data segments fingerprint list stored in the content storage volume.

When file 420 is to be stored to deduplication server 140, data segments fingerprints of file 420 are checked with content storage volume 340. If a data segment exists on a content storage volume 340, the content of the data segment will not be sent to and will not be stored on content storage volume 340. Only new segments are stored on content storage volume 340. After processing all data segments of file 420, metadata 422 is provided to the metadata database 325 along with fingerprint 427. Deduplication server 140 then checks to see if data associated with fingerprint 427 has already been stored in content storage volume 340. Since storage object 440 has already been provided to content storage volume 340, that data is not duplicated in the content storage volume. A similar process occurs for file 430 in which metadata 432 and the associated fingerprint 437 are stored in the metadata database but no duplication of data is made in content storage volume 340.

Figure 4B:
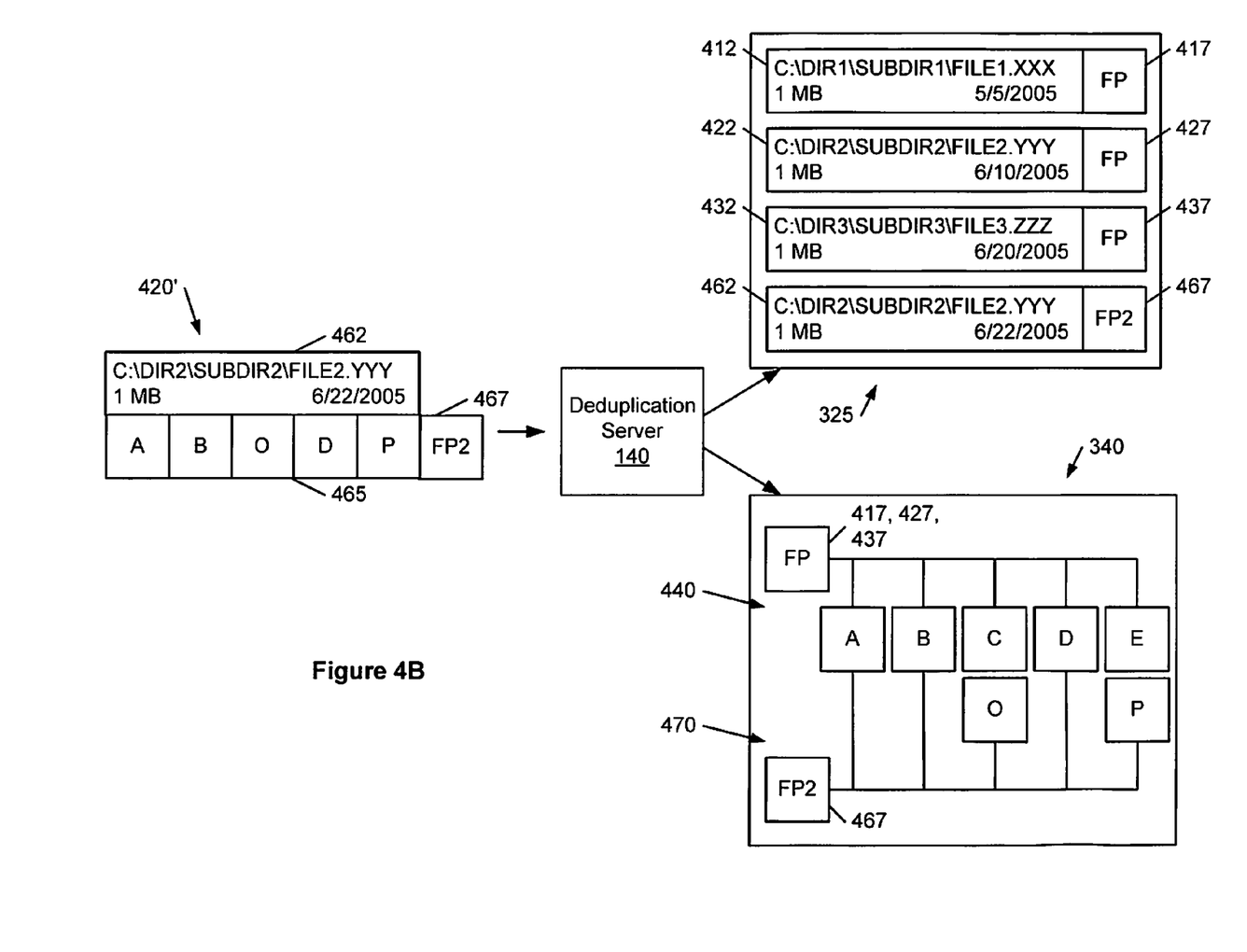
FIG. 4B is a simplified block diagram illustrating information stored in an event of a change in one of the files illustrated in FIG. 4A.

FIG. 4B is a simplified block diagram illustrating information stored in the event of a change of one of the files illustrated in FIG. 4A. FIG. 4B illustrates a change occurring in file 420 creating a file 420'. Metadata 462 associated with file 420' reflects a new modification date. Content 465 is illustrated showing that original segments C and E of file 420 have been changed to segments O and P, while the other segments remain the same. Since content 465 is different from original content 425, a different fingerprint 467 is generated.

When file 420' is provided to deduplication server 140, file metadata 462 is provided to metadata database 325 along with new fingerprint 467. Upon establishing that a storage object associated with fingerprint 467 has not been previously stored in content storage volume 340, file content 465 is provided to a content router associated with content storage volume 340. The content router can establish that of all the segments comprising file content 465, only segments O and P have yet to be stored in the content storage volume and fingerprint 467 is associated with the shared previously stored segments and the modified segment. One example of how a content router can determine whether a data segment has been previously stored is by maintaining checksums of each stored data segment and comparing a checksum of a data segment to be stored against those already stored. That association of fingerprint 467 and the previously stored and modified segments is stored as a storage object 470.

Generally, there are two general types of single-instance-storage systems. A Type 1 single-instance-storage system is configured to provide efficient use of network resources. Network efficiency is provided by having client computers perform a portion of the deduplication tasks and to only send non-duplicated data segments to the deduplication server. Client computers in a Type 1 system can query the deduplication server to determine whether a set of data segments has been changed and if so, which segments within the set of data segments need to be provided to the deduplication server. In this manner, network traffic due to transmitted data segments is minimized. A remote office backup is one example of an environment that can take advantage of a Type 1 single-instance-storage system.

In a Type 2 SIS system, the deduplication server performs the bulk of the deduplication tasks. Therefore, a Type 2 single-instance-storage system generally does not provide network optimization. Clients coupled to the single-instance-storage system send all of the clients' data segments to the single-instance-storage system regardless of the whether or not copies of the data segments already exist on the single-instance-storage system. The deduplication server then provides decision-making logic as to whether to store a particular data segment. Data center backups are one example of an environment that can take advantage of a Type 2 single-instance-storage system.

As discussed above, as new sets of data segments are stored in content volumes of an SIS system, duplication of previously stored data segments is prevented by replacing a new data segment with a pointer to the previously stored data segment. Over time, as subsequent storage of client-based data is made to the SIS system (e.g., backups), pointers may cause a content volume to have to access data segments stored at a variety of times and located on different places on the physical storage device of the content volume. Disk seek times then become a significant percentage of the total time for accessing the newly-stored set of data segments. Since a probability of requiring access to more recently stored data is higher than the probability of requiring access to older data, reducing access time to the newly-stored set of data segments is desirable to improve the overall efficiency of data access from the SIS system.

A mechanism for reducing disk seek times is to increase spatial locality of contiguous data segments. Thus, a single disk seek will locate a beginning of a larger set of data before a second disk seek is necessary. Since more recently stored data has a higher likelihood of being accessed (e.g., more recent backups), increasing spatial locality of more recently stored sets of data segments is desirable. In an SIS content volume, an increased spatial locality of more recently stored sets of data segments can be realized by sending duplicate data segments, which are stored contiguously on the content storage volume 340. These newly-stored segments to replace older data segments that are stored in scattered locations on the content storage volume 340.

Figure 5:
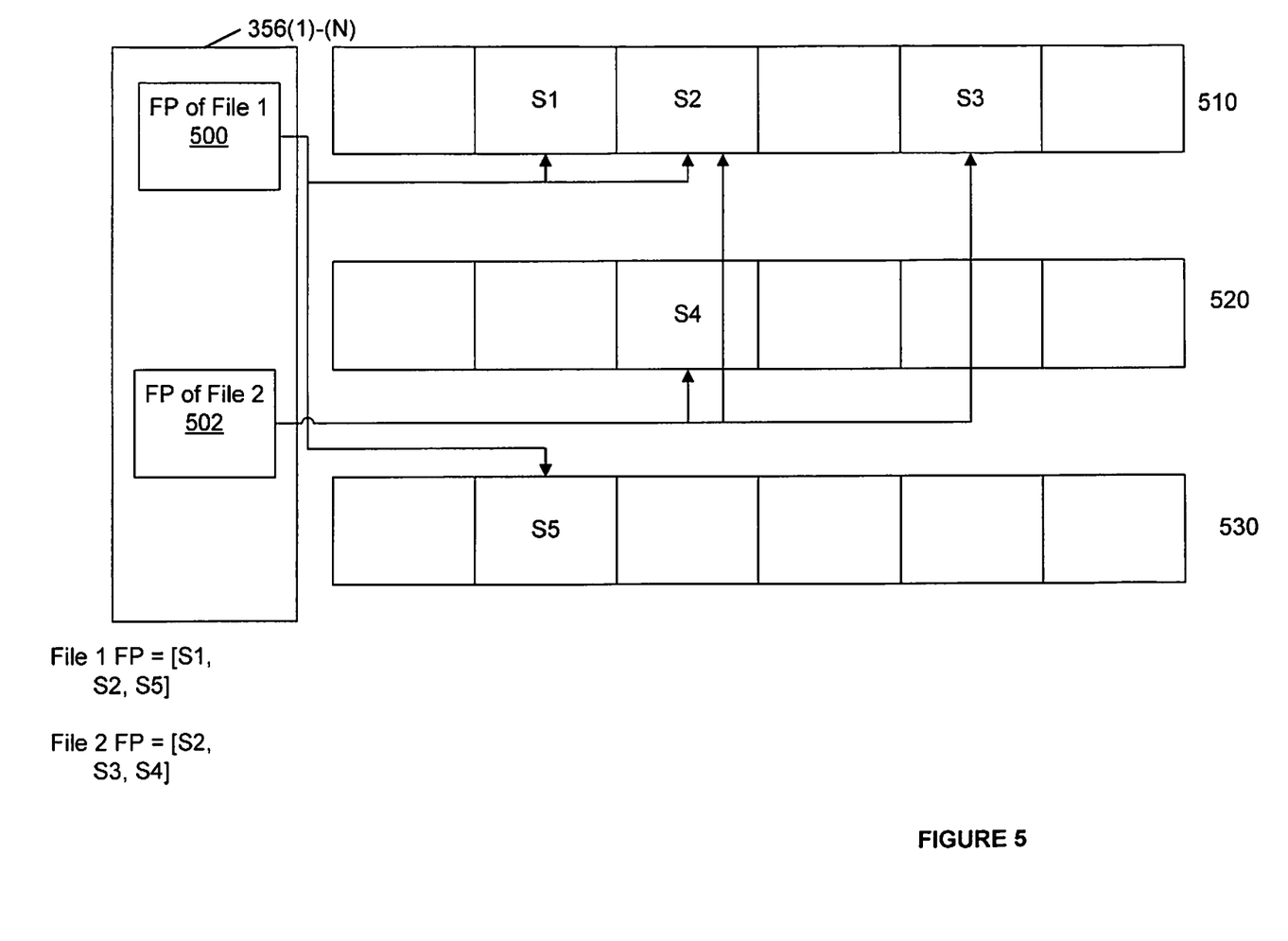
FIG. 5 is a simplified block diagram depicting a relationship between a file fingerprint and data segments stored in a collection of containers according to an embodiment of the present invention.

FIG. 5 is a simplified block diagram illustrating the relationship between FP-to-segment location mapping table 356(1)-(N) and data segments stored on content storage volumes 340 according to an embodiment of the present invention. As depicted, FP-to-segment location mapping table 356(1)-(N) includes multiple file fingerprint signatures 500 and 502. As previously discussed, a file fingerprint is a hash of the file content or a hash of the concatenation of the fingerprints of data segments that comprise the files. FP-to-segment location mapping tables 356(1)-(N) map the file and data segment fingerprint signatures to the actual storage location of the data segments. For example, File 1 comprises data segments S1, S2, and S5. File 2 comprises data segments S2, S3, and S4.

According to embodiments of the present invention, if a user desires to access and/or restore a file store on deduplication server 240, the user browses metadata database server 320 to choose a file to access and/or restore. Metadata database 320 stores the file fingerprint of the file and the list of data segment fingerprints are retrieved from the containers 354(1)-(N) based on the retrieved file fingerprint and the FP-to-segment location mapping table (the fingerprint list is stored as a segment). For each data segment fingerprint signature, the FP-to-segment location mapping table 356(1)-(N) is referenced to find the location of each data segment within content storage volumes 340.

According to some embodiments of the present invention, a client prepares a collection of data segments for sending to the deduplication server. Then, the client sends to the deduplication server a set of the fingerprints of the collection of data segments in the order the collection of data segments are originally stored on the client.

Upon receipt of the set of data segment fingerprints, the deduplication server responds by sending a storage location of a data segment if it exists within the single-instance storage volume (SIS) or an indication that the data segment does not exist within the SIS content volume associated with the deduplication server. According to an embodiment of the present invention, the client analyzes the received indications with the storage locations and determines if the number of disk seeks necessary to retrieve and/or restore files comprised of the set of data segments exceeds a predetermined threshold. If so, the client sends all data segment contents of the said data segment set along with their fingerprints to the deduplication server to ensure a group of contiguous data segments for storage within the SIS content volume.

As previously discussed, a SIS content volume stores only a single copy of a particular data segment. In order to provide only a single copy of the newly-provided segments, the mapping table between data segment fingerprint and data segment storage location is updated with the new storage locations, and the corresponding data segment contents stored at the previous storage locations are automatically removed through a mechanism called compaction. The compaction checks the fingerprint and storage location mapping table to determine if a data segment at a particular storage location within the single instance storage should be kept. If the said data segment should not be kept, it is removed. Upon updating the fingerprint and storage location mapping table, references to any previously-stored data segments are automatically updated to pointing to the most recently stored data segment.

Those with skill in the art will appreciate that the present invention does not limit the number of data segments sent as a set and a system administrator (or other user) may vary the number of data segments sent to their particular system.

Another embodiment of the present invention enables the deduplication server to store and/or reference more than one copy of a data segment within content volume 260. Such an embodiment improves the data access performance for both data stored at an earlier time and data stored recently through sacrificing some storage space with duplicate data segments. Those with skill in the art will appreciate that a system administrator (or other user) may vary the number of duplicate data segments stored and/or referenced within content volume 260.

Also, according to another embodiment of the present invention, the deduplication sever can independently periodically examine the organization of data segments in the SIS content volume and modify storage locations of the data segments by moving data segments to increase the number of contiguous groups of data segments.

Figure 6:
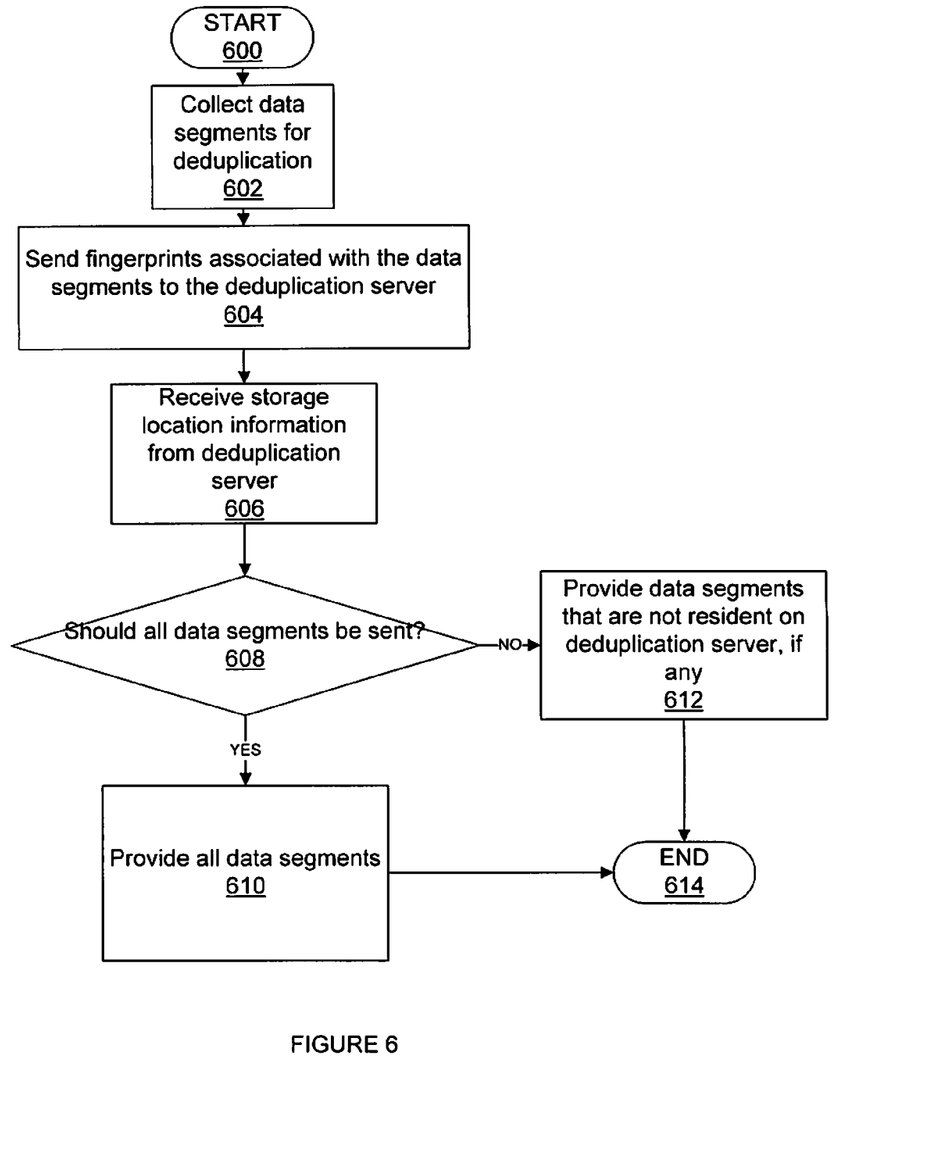
FIG. 6 is a flowchart illustrating client-side procedures for implementing an embodiment of the present invention.

FIG. 6 is a flowchart illustrating an example method for implementing an embodiment of the present invention. The process begins (600) and a client (e.g., client 210) prepares at least one data segment for transmission to a deduplication server (e.g., deduplication server 240). The client sends at least one fingerprint representing the at least one data segment to the deduplication server (604). The deduplication server accesses a FP-to-segment location mapping table (e.g., FP-to-segment location mapping table 356(1)-(N)) to determine (1) whether a copy of the data segment associated with the received fingerprint is already stored on a content storage volume (e.g., content storage volume 340); and (2) if a copy of the data volume associated with the received fingerprint is already stored on the content storage volume, the location of the data segment associated with the received fingerprint. The deduplication server responds to the client by sending the result of the aforementioned determination (e.g., existence of a pre-stored segment and the location of that segment) (606).

The client analyzes the information received from the deduplication server to determine if the data segment should be sent (608). Based on the location of the previously-stored segments, the client determines if a number of non-sequential accesses for the set of segments from the single-instance-storage volume exceeds a predetermined threshold. If so, the client provides the whole set of data segments for storage within the single-instance storage volume regardless of whether or not the data segments are duplicate data segments (610). These sent data segments will be stored contiguously within the single-instance storage volume. Subsequently, the duplicates will be removed from their previously-stored locations. If the number of non-sequential access for the segments from the single-instance storage volume does not exceed the predetermined threshold, the client provides just any new or modified data segments that are not already stored on the server (610). Those with skill in the art will appreciate that the process described in FIG. 6 may be repeated as an iterative process for transferring multiple data segment sets to a single-instance-storage volume.

As discussed, a method and system for improving performance with single-instance-storage volumes by leveraging data locality is provided. A client provides a fingerprint list of a set of data segments to a single-instance storage volume. The client determines if the number of non-sequential accesses of a computer-readable medium for the said set of data segments in the single-instance-storage volume exceeds a predetermined threshold upon receiving the existence and storage location information on the said set of the data segments from the single instance storage. If so, the client provides all data segments contents along with their fingerprints within the said data set for storage within the single-instance storage volume regardless a segment is duplicated in the single-instance-storage volume; otherwise, the client sends segments that do not exist within the single instance storage for storage within the single instance storage.

An Example Computing And Network Environment

As shown above, the present invention can be implemented using a variety of computer systems and networks. An example of one such computing and network environment is described below with reference to FIGS. 7 and 8.

Figure 7:
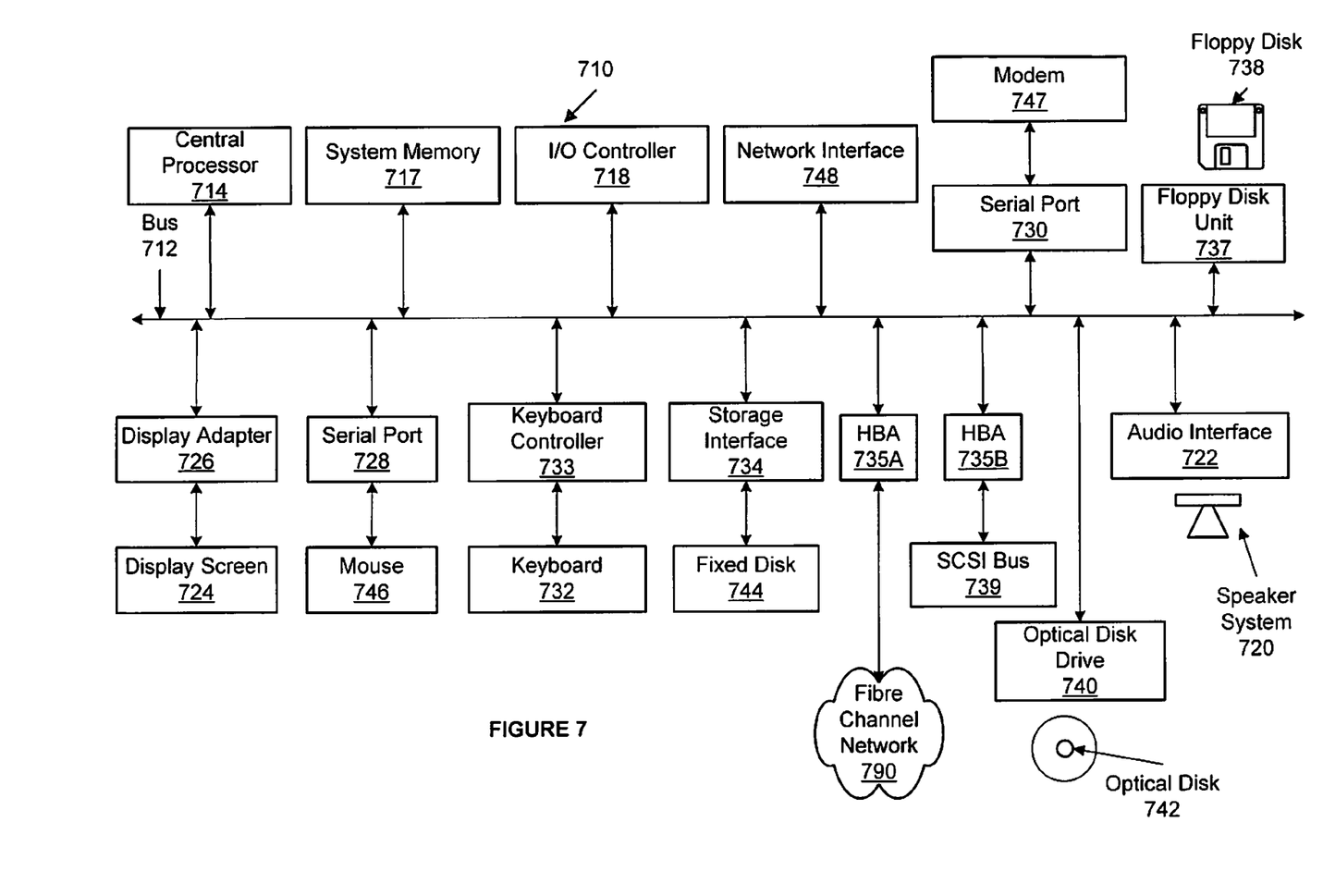
FIG. 7 illustrates an example data processing system in which an embodiment of the present invention may be implemented.

FIG. 7 depicts a block diagram of a computer system 710 suitable for implementing aspects of the present invention (e.g., clients 210, backup server 230, and deduplication server 240). Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk drive 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 710 are generally stored on and accessed via a computer-readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer-readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present invention. The devices and subsystems can be interconnected in different ways from that shown in FIG. 7. The operation of a computer system such as that shown in FIG. 7 is readily known in the art and is not discussed in detail in this application. Code to implement the present invention can be stored in computer-readable storage media such as one or more of system memory 717, fixed disk 744, optical disk 742, or floppy disk 738. The operating system provided on computer system 710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
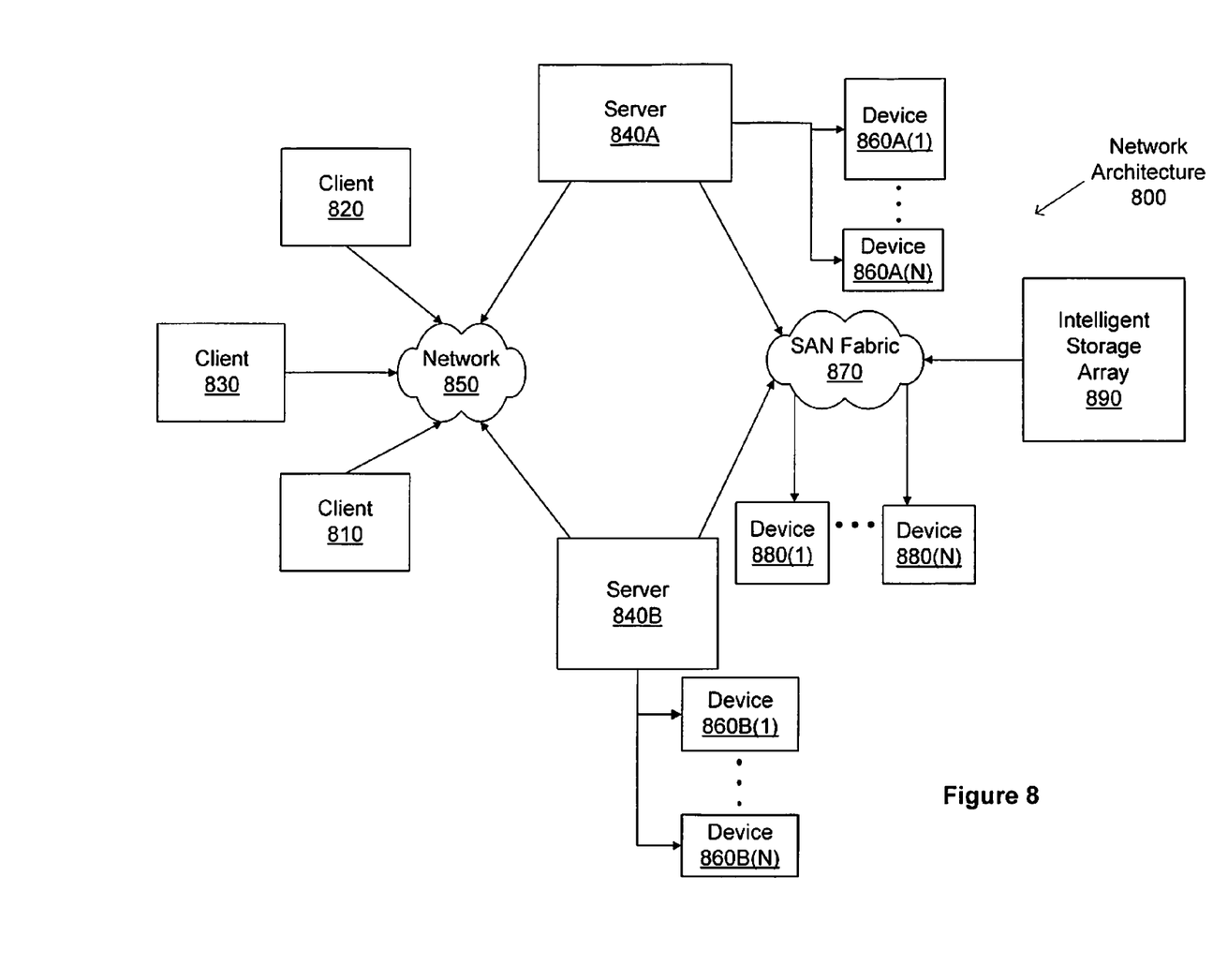
FIG. 8 depicts an example network architecture in which an embodiment of the present invention may be implemented.

FIG. 8 is a block diagram depicting a network architecture 800 in which client systems 810, 820 and 830, as well as storage servers 840A and 840B (any of which can be implemented using computer system 610), are coupled to a network 850. Storage server 840A is further depicted as having storage devices 860A(1)-(N) directly attached, and storage server 840B is depicted with storage devices 860B(1)-(N) directly attached. Storage servers 840A and 840B are also connected to a SAN fabric 870, although connection to a storage area network is not required for operation of the invention. SAN fabric 870 supports access to storage devices 880(1)-(N) by storage servers 840A and 840B, and so by client systems 810, 820 and 830 via network 850. Intelligent storage array 890 is also shown as an example of a specific storage device accessible via SAN fabric 870.

With reference to computer system 710, modem 747, network interface 748 or some other method can be used to provide connectivity from each of client computer systems 810, 820 and 830 to network 850. Client systems 810, 820 and 830 are able to access information on storage server 840A or 840B using, for example, a web browser or other client software (not shown). Such a client allows client systems 810, 820 and 830 to access data hosted by storage server 840A or 840B or one of storage devices 860A(1)-(N), 860B(1)-(N), 880(1)-(N) or intelligent storage array 890. FIG. 8 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Although the present invention has been described in connection with several embodiments, the invention is not intended to be limited to the specific forms set forth herein. On the contrary, it is intended to cover such alternatives, modifications, and equivalents as is reasonably included within the scope of the invention as defined by the appended claims.

What is claimed is:

1. A method comprising:
   identifying a first set of storage locations that store a set of data segments, wherein
      a single-instance-storage volume comprises the first set of storage locations, and
      the single-instance-storage volume stores de-duplicated data segments;
   determining if the number of disk seeks needed to retrieve each data segment of the set of data segments from the first set of storage locations exceeds a predetermined threshold, wherein
      the set of data segments is contiguously accessed from a local storage volume, and
      the number of disk seeks indicates the number of non-sequential accesses needed to retrieve the each data segment of the set of data segments from the first set of storage locations; and
   providing all data segments in the set of data segments for contiguous storage in a second set of storage locations within the single-instance-storage volume, in response to determining that the number of disk seeks needed to retrieve the each data segment of the set of data segments from the first set of storage locations exceeds the predetermined threshold, wherein
      the single-instance-storage volume comprises a duplicate of at least one of the data segments in the set of data segments.

2. The method of claim 1, further comprising:
   removing data segment content from the first set of storage locations; and
   adding one or more pointers to the set of data segments to identify the second set of storage locations, wherein
      the removing and adding are performed in response to determining that the number of disk seeks needed to retrieve the each data segment of the set of data segments from the first set of storage locations exceeds the predetermined threshold.

3. The method of claim 1, further comprising:
   in response to determining that the number of disk seeks needed to retrieve the each data segment of the set of data segments from the first set of storage locations does not exceed the predetermined threshold, providing only a subset of data segments among the set of data segments, wherein
      the subset of data segments comprises data segments not already stored on the single-instance-storage volume.

4. The method of claim 3, further comprising:
   updating references to the set of data segments in the single-instance-storage volume.

5. The method of claim 1, further comprising:
   accessing a fingerprint-to-segment location mapping table to determine the first set of storage locations;
   receiving the first set of storage locations; and
   analyzing the first set of storage locations to determine the number of disk seeks needed to retrieve the each data segment of the set of data segments from the first set of storage locations.

6. A system comprising:
   at least one processor;
   an interconnect coupled to the at least one processor;
   a network interface coupled to the at least one processor via the interconnect, wherein
      the network interface enables the system to send data to and receive data from a single-instance-storage volume over a network; and
   a computer-readable medium coupled to the at least one processor via the interconnect, wherein the computer-readable medium comprises instructions executable by the at least one processor and configured to:
      identify a first set of storage locations that store a set of data segments, wherein
         the single-instance-storage volume comprises the first set of storage locations, and
         the single-instance storage volume stores de-duplicated data segments;
      determine if the number of disk seeks needed to retrieve each data segment of the set of data segments from the first set of storage locations exceeds a predetermined threshold, wherein
         the set of data segments is contiguously accessed from a local storage volume, and
         the number of disk seeks indicates the number of non-sequential accesses needed to retrieve the each data segment of the set of data segments from the first set of storage locations; and
      provide all data segments in the set of data segments for contiguous storage in a second set of storage locations within the single-instance-storage volume, in response to determining that the number of disk seeks needed to retrieve the each data segment of the set of data segments from the first set of storage locations exceeds the predetermined threshold, wherein
         the single-instance-storage volume comprises a duplicate of at least one of the data segments in the set of data segments.

7. The system of claim 6, wherein the instructions are further configured to:
   remove data segment content from the first set of storage locations; and
   add one or more pointers to the set of data segments to identify the second set of storage locations, wherein
      the removing and adding are performed in response to determining that the number of disk seeks needed to retrieve the each data segment of the set of data segments from the first set of storage locations exceeds the predetermined threshold.

8. The system of claim 6, wherein the instructions are further configured to:
   in response to determining that the number of disk seeks needed to retrieve the each data segment of the set of data segments from the first set of storage locations does not exceed the predetermined threshold, provide only a subset of data segments among the set of data segments, wherein
      the subset of data segments comprises data segments not already stored on the single-instance-storage volume.

9. The system of claim 6, wherein the instructions are further configured to:
   update references to the set of data segments in the single-instance-storage volume.

10. The system of claim 7, wherein the instructions are further configured to:
    access a fingerprint-to-segment location mapping table to determine the first set of storage locations;
    receive the first set of storage locations; and
    analyze the first set of storage locations to determine the number of disk seeks needed to retrieve the each data segment of the set of data segments from the first set of storage locations.

11. An apparatus comprising:
    a memory;
    a processor;
    means for identifying a first set of storage locations that store a set of data segments, using the processor, wherein
       a single-instance-storage volume comprises the first set of storage locations, and
       the single-instance-storage volume stores de-duplicated data segments;
    means for determining if the number of disk seeks needed to retrieve each data segment of the set of data segments from the first set of storage locations exceeds a predetermined threshold, using the processor, wherein
       the set of data segments is contiguously accessed from a local storage volume, and
       the number of disk seeks indicates the number of non-sequential accesses needed to retrieve the each data segment of the set of data segments from the first set of storage locations;
    means for providing all data segments in the set of data segments for contiguous storage in a second set of storage locations within the single-instance-storage volume, using the processor, in response to determining that the number of disk seeks needed to retrieve the each data segment of the set of data segments from the first set of storage locations exceeds the predetermined threshold, wherein
       the single-instance-storage volume comprises a duplicate of at least one of the data segments in the set of data segments; and
    means for sending data to and receiving data from a single-instance-storage volume over a network, using the processor.

12. The apparatus of claim 11, further comprising:
    means for removing data segment content from the first set of storage locations, using the processor; and
    means for adding one or more pointers to the set of data segments to identify the second set of storage locations, using the processor, wherein
       the removing and adding are performed in response to determining that the number of disk seeks needed to retrieve the each data segment of the set of data segments from the first set of storage locations exceeds the predetermined threshold.

13. The apparatus of claim 11, further comprising:
    means for providing only a subset of data segments among the set of data segments, using the processor, in response to determining that the number of disk seeks needed to retrieve the each data segment of the set of data segments from the first set of storage locations does not exceed the predetermined threshold, wherein
       the subset of data segments comprises data segments not already stored on the single-instance-storage volume.

14. The apparatus of claim 11, further comprising:
    means for updating references to the set of data segments in the single-instance-storage volume, using the processor.

15. The apparatus of claim 11, further comprising:
    means for accessing a fingerprint-to-segment location mapping table to determine the first set of storage locations, using the processor;
    means for receiving the first set of storage locations, using the processor; and
    means for analyzing the first set of storage locations to determine the number of disk seeks needed to retrieve the each data segment of the set of data segments from the first set of storage locations, using the processor.

* * * * *